United States Patent [19]

Deguchi et al.

[11] Patent Number: 4,724,076

[45] Date of Patent: Feb. 9, 1988

[54] CENTRIFUGAL SEPARATOR FOR SEPARATING SLUDGE IN WASTE WATER

[75] Inventors: Nobuyuki Deguchi, Kawanishi; Norio Shintani, Kobe; Mikio Morita, Kobe; Shiro Ohno, Kobe, all of Japan

[73] Assignee: Sasakura Engineering Co., Ltd., Kobe, Japan

[21] Appl. No.: 893,190

[22] Filed: Jul. 21, 1986

[30] Foreign Application Priority Data

Aug. 2, 1985 [JP] Japan .......................... 60-119710[U]
Apr. 18, 1986 [JP] Japan .......................... 61-59250[U]

[51] Int. Cl.⁴ .......................... B01D 17/038

[52] U.S. Cl. .......................... 210/360.2; 210/369; 210/330.1

[58] Field of Search .......................... 210/359, 360.1, 360.2, 210/363-365, 367, 369, 378, 379, 380.1; 494/38, 40, 41, 43, 56, 60, 65, 67, 68, 69, 74, 79

[56] References Cited

FOREIGN PATENT DOCUMENTS 61-15968 2/1982 Japan .
61-7801 3/1986 Japan .

*Primary Examiner*—Frank Sever

*Attorney, Agent, or Firm*—Marshall, O'Toole, Gerstein, Murray & Bicknell

[57] ABSTRACT

This disclosure relates to a centrifugal separator for separating suspended substances from a liquid such as the waste water of a ship. The centrifugal separator comprises a base frame, a tubular drive shaft journalled vertically on the frame and adapted to be driven, a cylindrical rotor fixed coaxially to the shaft adjacent one end thereof, a circumferential chamber formed inside the rotor around the shaft and the chamber having upper and lower ports adjacent the shaft, a pipe fixed coaxially inside the shaft, an inner passage formed inside the pipe, an annular passage formed inside the shaft and around the pipe, each of the passages communicating with one of the ports, axially aligned first and second headers formed on the frame, each of the headers having a port, the other end of the shaft extending rotatably into the first header so that annular passage opens in the first header, and one end of the pipe extends rotatably through the first header and into the second header so that the inner passage opens in the second header. The circumferential chamber is formed by an outer cylindrical wall and an inner conical wall, the diameter of the conical wall increasing in the downward direction.

5 Claims, 3 Drawing Figures

CENTRIFUGAL SEPARATOR FOR SEPARATING SLUDGE IN WASTE WATER

FIELD AND BACKGROUND OF THE INVENTION

This invention relates to a centrifugal separator for separating suspended substances (sludge) in waste water, prior to the measurement of the oil density in the waste water which is to be discharged outboard from a ship.

Usually, before discharging waste water outboard from a ship, a small sample of the waste water is taken in order to measure the oil density contained in the waste water. If the oil density of the waste water is at or below the legally specified level, the waste water discharge valve is opened and the waste water is discharged outboard. To measure the oil density in the sample waste water, use is made of an optical oil densitometer, which is based on the principle that the light transmission rate and light scattering rate vary with the oil density when light is passed through the sample waste water. However, if there are suspended substances such as rust in the waste water, the measured values of the oil density may be in error, and therefore the sample waste water should be cleared of such suspended substances prior to the measurement of the oil density using the optical oil densitometer.

There exists a certain time lag between the collection of a sample of the waste water and the opening/closing of the outboard discharge valve, for the waste water to flow to and reach the discharge valve from the sampling part; consequently due to this time lag, waste water having a high oil density may be discharged outboard. For this reason, the time span between the collection of the sample waste water and the measurement of the oil density should be made as short as possible; thus, for removing suspended substances in the sample waste water, the time required should be made even shorter.

For this purpose, conventionally a centrifugal separator, such as that shown in FIG. 3, has been used for separating and removing suspended substances, as a pretreatment prior to the measurement of the oil density.

The conventional separator includes a cylindrical bucket 2 mounted inside a cover casing 1; this bucket is rotated at high speed by means of a drive shaft 3. A waste water inlet pipe 4 extending straight down from the upper part of the cover casing 1 reaches almost to the bottom of the bucket 2. In the upper part of the bucket 2 is formed an annular-grooved separated waste water chamber 5, and the waste water inlet pipe 4 passes through the inside of the separated waste water chamber 5. A waste water outlet pipe 6 is connected to the chamber 5, and surrounds the inlet pipe 4. The suspended substances in the waste water supplied to bucket 2 by the waste water inlet pipe 4 are separated by being pressed against the inner surface of the wall of the bucket 2, by reason of the centrifugal force generated due to the rotation of the bucket 2. The waste water from which the suspended substances have been separated out, flows into the separated waste water chamber 5, where it is pressed to the inner surface by means of centrifugal force so as to be discharged outside through the waste water outlet pipe 6.

In the conventional centrifugal separator as described above, a gap 7 for preventing the waste water outlet pipe 6 from coming into contact with the rotating separated waste water chamber 5, is provided between the separated waste water chamber 5 and the waste water outlet pipe 6. Therefore, if cleaning water is supplied through the waste water inlet pipe 4 to clean the inside of the bucket 2, after the rotation of the bucket 2 has halted, this cleaning water flows out only through the gap 7 between the separated waste water chamber 5 and the waste water outlet pipe 6, and it never flows out of the waste water outlet pipe 6. (It flows out through the waste water outlet pipe 6 only when the bucket 2 is rotating.)

Accordingly, the suspended substances separated and deposited on the inner surface of the bucket 2 cannot be discharged or removed by pouring in cleaning water. The suspended substances separated and deposited on the inner surface of the bucket 2 can be discharged or removed only by disassembling the entire unit. This makes the job of discharging and removing suspended substances extremely complex and troublesome. Moreover, during the separation process, flammable gas in the waste water gushes out of the gap 7 between the separated waste water chamber 5 and the waste water outlet pipe 6, and it remains in the space between the cover casing 1 and the bucket 2, posing the danger of an explosion due to sparks, etc. generated by contact of the bucket with the cover casing 1 during operation. Therefore, when mounting this centrifugal separator for pretreatment purposes on a ship, an inert gas such as nitrogen must be filled and enveloped in the cover casing 1 so as to make the mechanism explosion-proof. This requires a large financial investment.

Furthermore, the separated waste water from the waste water outlet pipe 6 in the conventional centrifugal separator is discharged under almost no pressure, thus requiring a transfer pump for moving this separated waste water to the oil densitometer. This, of course, is another problem.

Moreover, for separating suspended substances inside the bucket, the oil in the waste water adheres to the surface of several umbrella-like parts 8 which are mounted inside the bucket, thereby delaying the discharge from inside the bucket and resulting in prolongation of the time needed for separation and removal of suspended substances.

The present invention is designed to solve the foregoing problems encountered with the conventional centrifugal separator.

BRIEF SUMMARY OF THE INVENTION

A centrifugal separator according to this invention comprises a base frame, a tubular drive shaft journalled vertically on the frame and adapted to be driven, a cylindrical rotor fixed coaxially to the shaft adjacent one end thereof, a circumferential chamber formed inside the rotor around the shaft, the chamber having upper and lower ports adjacent the shaft, a pipe fixed coaxially inside the shaft, an inner passage formed inside the pipe, an annular passage formed inside the shaft around the pipe, each of the passages communicating with one of the ports, axially aligned first and second headers formed on the frame, each of the headers having a port, the other end of the shaft extending rotatably into the first header, so that the annular passage opens in the first header, and one end of the pipe extending rotatably through the first header and into the second header, so that the inner passage opens in the second header.

BRIEF DESCRIPTION OF THE DRAWINGS

This invention will be better understood from the following detailed description taken in conjunction with the accompanying figures of the drawings, wherein.

DETAILED DESCRIPTION OF THE DRAWINGS

Figure 1:
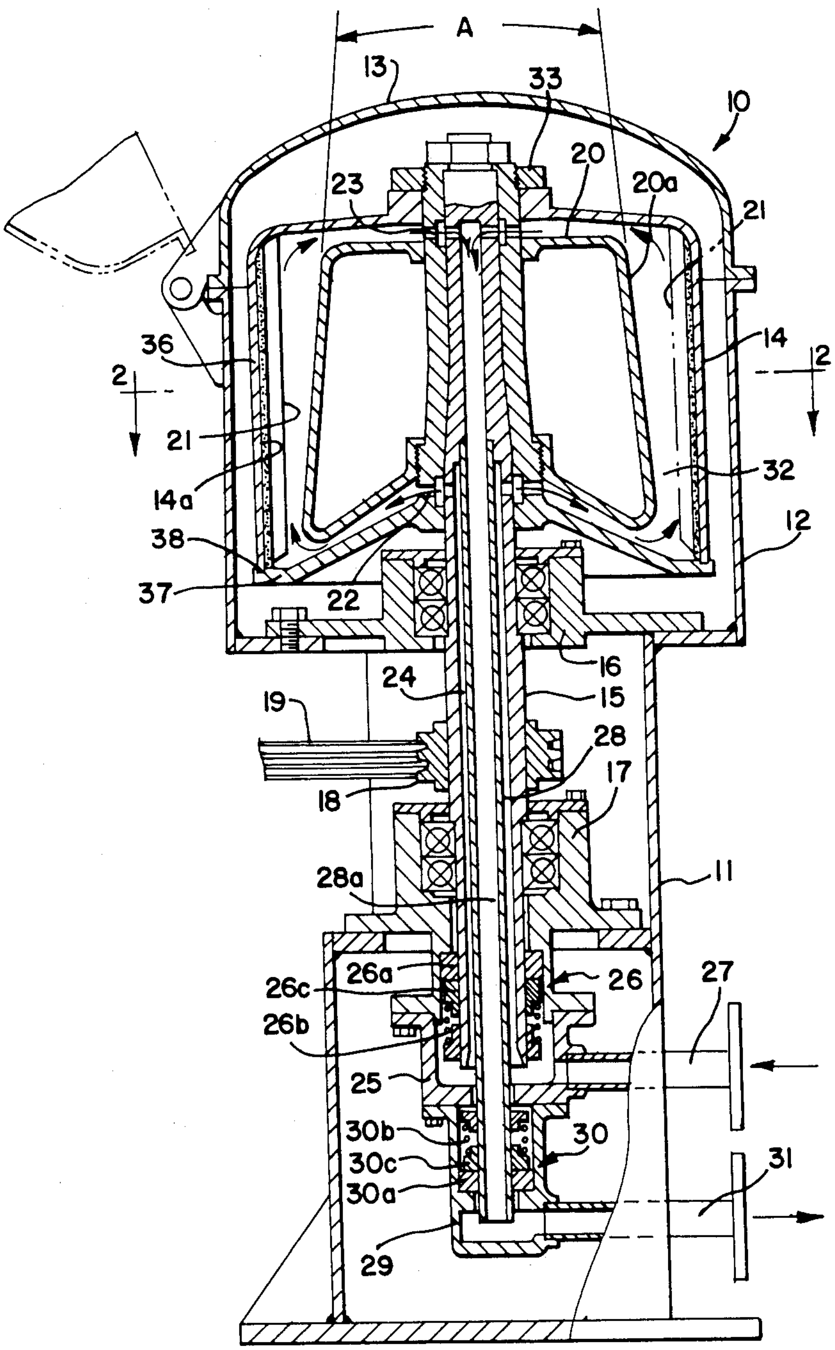
FIG. 1 is a front vertical section of a centrifugal separator in accordance with this invention.
Figure 2:
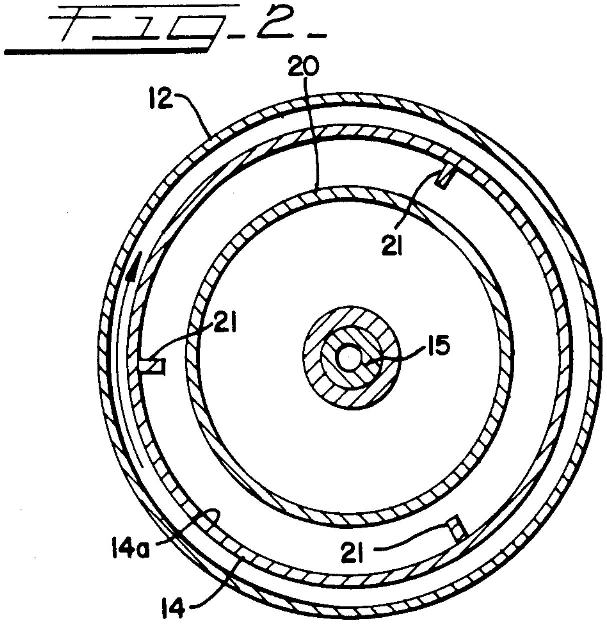
FIG. 2 is a sectional taken on the line II—II of FIG. 1.
Figure 3:
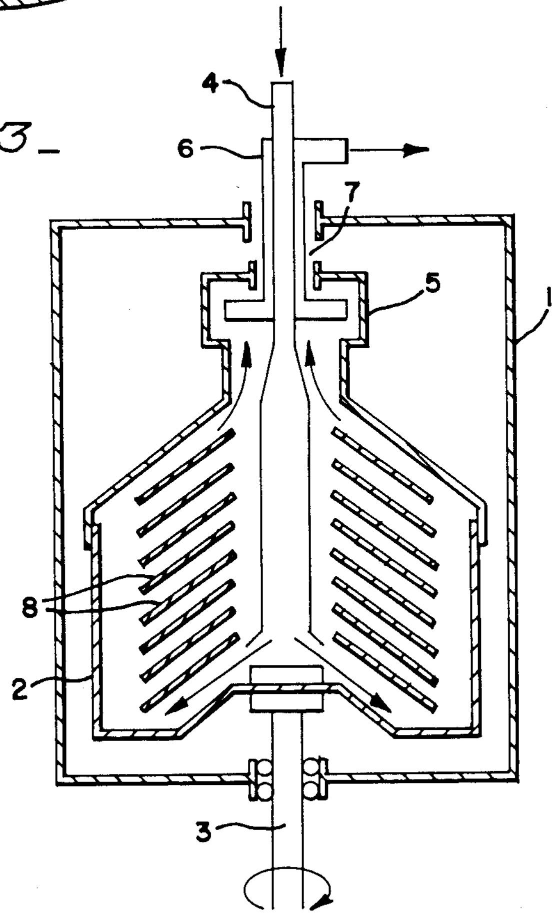
FIG. 3 PRIOR ART
FIG. 3 is a diagrammatic view of a conventional centrifugal separator.

In FIGS. 1 and 2, a centrifugal separator 10 includes a base frame 11 and a casing 12 fixed to the top of the frame 11. The casing 12 has a top lid 13 hinged to it to be manually opened and closed, the open position of the lid 13 being shown in dash-dot-dot lines in FIG. 1. The lid 13 can be locked when in the closed position shown in solid lines.

The casing 12 houses a cylindrical rotor or bucket 14 fixed coaxially and removably to the upper end of a vertical tubular drive shaft 15 which is journalled by two bearings 16 and 17 on the frame 11. The rotor 14 is rotated at a specific rate by an electric or hydraulic motor (not shown) through belts 19 connected to a pulley 18 fastened on the shaft 15.

The rotor 14 houses a conical or tapered member 20 fixed to it, forming an annular or circumferential separation chamber 32 between the outer conical surface 20*a* of the member 20 and the inner cylindrical surface 14*a* of the rotor 14. The chamber 32 has inlet ports 22 formed at the lower center of the rotor 14, and outlet ports 23 at the upper center. The diameter of the conical surface 20*a* increases in the downward direction. The rotor 14 has a plurality of vertical ribs 21 fixed to the inner surface 14*a*.

The hollow drive shaft 15 surrounds a pipe 28 which is fixed to it, forming an inner passage 28*a* inside the pipe 28, and an outer annular passage 24 around the pipe 28 and inside the shaft 15. The annular passage 24 communicates with the inlet ports 22, and the inner passage 28*a* communicates with the outlet ports 23.

The lower end of the shaft 15 extends rotatably into an upper header 25 formed in the frame 11, so that the bottom of the annular passage 24 opens in the header 25. The lower end of the shaft is sealed to the header with a rotary mechanical seal 26, which includes a seat ring 26*a* and a seal ring 26*c* urged against the seat ring 26*a* by a spring 26*b*. The header 25 has an inlet 27.

The lower end of the pipe 28 extends rotatably through the lower side of the header 25 and into a lower header 29, which is mounted on the lower surface of the upper header 25, so that the inner passage 28*a* of the pipe 28 opens in the lower header 29. The lower end of the pipe is sealed to the lower header with a rotary mechanical seal 30, which includes a seat ring 30*a* and a seal ring 30*c* urged against the seat ring 30*a* by a spring 30*b*. The lower header 29 is connected to an outlet 31.

In operation, while the drive shaft 15 and the rotor 14 are rotating, waste water is supplied under pressure through the inlet 27, the upper header 25, the annular passage 24 and the ports 22 to the lower portion of the separation chamber 32 formed between the rotor 14 and the member 20. While flowing upwards (due to the inlet pressure) toward the outlet ports 23 inside the chamber 32, the water is subjected to the centrifugal force due to the rotation of the rotor 14 and the ribs 21, and the suspended substances in the waste water are precipitated and separated by being pressed onto the inner surface 14*a*. The water after separation passes through the outlet ports 23, inner passage 28*a*, lower header 29 and outlet 31, and is sent to a conventional oil densitometer (not shown).

Thus, the lower ends of the shaft 15 and the pipe 28, which rotate with the rotor 14, are rotatable in the fixed headers 25 and 29, respectively, and hermetically sealed, making the entire route from the inlet 27 to the outlet 31 a hermetically sealed structure. This prevents any inflammable gas contained in the waste water from leaking out of the system.

The water forced into the inlet 27 flows to the outlet 31 by its own pressure. The pressure of the water discharged from the outlet 31 is the pressure of the water fed to the inlet 27 less the pressure loss in moving through the separator. By setting the pressure of the water fed to the inlet 27 at a sufficient level (with the above pressure loss taken into account), the water being discharged from the outlet 31 can be maintained at a considerable pressure level. This eliminates the necessity of using a pump to move the water from the outlet 31 to the oil densitometer.

The water forced into the inlet 27 flows out of the outlet 31 even when rotation of the rotor 14 is halted. Therefore, if, after a separation process, cleaning water is forced into the inlet 27 even while the rotor 14 is not rotating, the cleaning water will flow through the rotor 14 and out of the outlet 31. This enables the suspended substances precipitated and separated on the inner rotor surface 14*a* to be washed away and removed.

Instead, the cleaning water may be forced into the outlet 31 and discharged from the inlet 27.

Only in case the above procedure proves insufficient to remove the suspended substances inside the rotor 14, the lid 13 of the casing 12 may be swung open on the hinge as shown by the dash-dot-dot lines in FIG. 1, and the nut 33 fastening the rotor 14 to the drive shaft may be removed to disassemble the rotor 14 and manually remove the suspended substances from the inside. The rotor 14 is formed by an upper inverted cup-shaped part 36 and a lower disk-shaped part 37, and the lower edge of the cup 36 fits into a groove 38 of the disk 37. Therefore after the nut 33 has been removed from the separator, the cup 36 may be lifted off the disk 37 to gain access to the interior of the cup.

In the separation and removal of suspended substances from the water inside the chamber 32, since the substances are heavier than water, they are separated by being pressed onto the inner rotor surface 14*a* by the centrifugal force, but the oil in the waste water, being lighter than water, is gathered on the outer conical surface 20*a* of the member 20.

If this surface 20*a* were not conical but cylindrical, when the oil gathered on the surface 20*a* moves up along the surface due to the difference in the specific gravities of oil and water and the water flow, the rate of adhesion to the surface 20*a* would increase, and the oil adhered to the surface 20*a* would move upward and be peeled off from the surface 20*a* after growing into large oil drops, thus delaying the flow of the oil from the chamber 32. In other words, the amount of time needed for the separation and removal of suspended substances would be prolonged by this action.

In this invention, however, the surface 20*a* is conical with a diameter that increases in the downward direction, as mentioned above. This reduces the amount of oil which adheres to the surface 20*a* when the oil gathered on it moves upward. Thus, the oil content introduced to the lower portion of the surface 20*a* promptly reaches the upper portion, successfully preventing the delay in the flow of oil content out of the chamber 32.

The angle A (FIG. 1) of taper of the surface 20*a* should be large from the standpoint of shortening the time required for the discharge of the oil content. However, the interior volume of the chamber 32 increases with an increase of the angle A, thus raising the volume of water pooled inside the chamber 32. Therefore, this angle should be within limits. experiments, the preferred angle range has been found to be between 2 and 40 degrees, with the most advantageous angle being 10 degrees.

What is claimed is:

1. A centrifugal separator comprising: means for removing only sludge from a sample liquid, which contains water, oil and sludge, prior to sending the liquid to an oil density meter, in order to accurately measure the oil content in the liquid, including, a base frame, a tubular drive shaft journalled substantially vertically on said frame and adapted to be rotatably driven, a hollow rotor having an inner cylindrical wall and fixed coaxially to said shaft adjacent one end of said shaft, a conical member fixed coaxially to said shaft inside said rotor, the diameter of said conical member increasing downwardly, a circumferential chamber formed between said cylindrical rotor wall and said conical member, said chamber having an inlet port and an outlet port above said inlet port, a pipe fixed coaxially inside said shaft, an inner passage formed inside said pipe, and an annular passage formed inside said shaft and outside said pipe, each of said passages communicating with one of said ports, axially aligned first and second headers mounted on said frame and each having a port, the other end of said shaft extending rotatably into said first header so that said annular passage opens in said first header, and one end of said pipe extending rotatably through said first header and into said second header, so that said inner passage opens in said second header, such that the sludge content is trapped on said cylindrical wall as said rotor rotates with the liquid moving upwardly through said circumferential chamber.

2. A separator according to claim 1, and further comprising vertical ribs on said inner cylindrical wall of the rotor.

3. A separator according to claims 1 or 2, and further comprising a mechanical seal provided between said other end of the shaft and the first header, and another mechanical seal provided between said one end of the pipe and the second header.

4. A separator according to claim 1 or 2, and further including a tapered cylindrical member mounted on said shaft and within said rotor, said chamber being formed between the diameter of said conical member decreasing in the upward direction, and the angle of said conical member being approximately within the range of 2° to 40°.

5. A separator according to claim 4, wherein said angle is approximately 10°.

* * * * *